(12) United States Patent
Staghøj et al.

(10) Patent No.: US 11,231,018 B2
(45) Date of Patent: Jan. 25, 2022

(54) WIND TURBINE NACELLE WITH ON-BOARD FLUID SYSTEM

(71) Applicant: Vestas Wind Systems A/S, Aarhus N. (DK)

(72) Inventors: Michael Staghøj, Ry (DK); Poul T. Tietze, Brabrand (DK); Tommy Eschelund, Tjele (DK)

(73) Assignee: Vestas Wind Systems A/S, Aarhus N. (DK)

( * ) Notice: Subject to any disclaimer, the term of this patent is extended or adjusted under 35 U.S.C. 154(b) by 64 days.

(21) Appl. No.: 16/606,439

(22) PCT Filed: Apr. 6, 2018

(86) PCT No.: PCT/DK2018/050064
§ 371 (c)(1),
(2) Date: Oct. 18, 2019

(87) PCT Pub. No.: WO2018/196933
PCT Pub. Date: Nov. 1, 2018

(65) Prior Publication Data
US 2021/0108621 A1  Apr. 15, 2021

(30) Foreign Application Priority Data
Apr. 26, 2017 (DK) .............................. PA 2017 70284

(51) Int. Cl.
| F03D 80/60 | (2016.01) |
| F03D 80/80 | (2016.01) |
| F03D 80/50 | (2016.01) |

(52) U.S. Cl.
CPC ............. *F03D 80/60* (2016.05); *F03D 80/88* (2016.05); *F03D 80/50* (2016.05); *F05B 2240/14* (2013.01); *F05B 2260/205* (2013.01)

(58) Field of Classification Search
None
See application file for complete search history.

(56) References Cited

U.S. PATENT DOCUMENTS

| 8,206,112 B2* | 6/2012 | Tietze | ................... F03D 80/60 416/175 |
| 8,403,638 B2* | 3/2013 | Matsuo | ................... F03D 80/60 415/177 |

(Continued)

FOREIGN PATENT DOCUMENTS

| CN | 106194609 A | 12/2016 |
| DE | 102008027365 A1 | 12/2009 |

(Continued)

OTHER PUBLICATIONS

European Patent Office, International Search Report and Written Opinion in PCT/DK2018/050064, dated Jul. 9, 2018.

(Continued)

*Primary Examiner* — Ninh H. Nguyen
*Assistant Examiner* — Jason G Davis
(74) *Attorney, Agent, or Firm* — Wood Herron & Evans LLP

(57) ABSTRACT

A wind turbine nacelle comprising a plurality of power generating components and a fluid system, wherein the nacelle includes a nacelle cover comprising a lower cover or 'base', a roof and side walls, thereby defining an interior space of the nacelle, wherein the fluid system includes a fluid tank that is integrated into the nacelle cover. The invention extends to a panel of a wind turbine nacelle cover, wherein the panel is configured to define at least apart of, or is coupled to, a fluid tank of a fluid system of the wind turbine.

16 Claims, 6 Drawing Sheets

(56) References Cited

U.S. PATENT DOCUMENTS

| | | | | |
|---|---|---|---|---|
| 8,585,358 B2 * | 11/2013 | Matsuo | ................... | F03D 80/88 |
| | | | | 415/176 |
| 8,608,442 B2 * | 12/2013 | Numajiri | ............... | F03D 7/0224 |
| | | | | 416/42 |
| 2011/0095539 A1 | 4/2011 | Tietze et al. | | |
| 2013/0038065 A1 * | 2/2013 | Versteeg | ................ | H02K 7/116 |
| | | | | 290/53 |
| 2015/0016976 A1 * | 1/2015 | Roer | ....................... | F03D 13/10 |
| | | | | 415/182.1 |

FOREIGN PATENT DOCUMENTS

| | | | | | |
|---|---|---|---|---|---|
| EP | | 2600000 | A2 | 6/2013 | |
| EP | | 2942522 | A1 * | 11/2015 | ............ F03D 80/00 |
| JP | | 2013172535 | A | 9/2013 | |
| WO | | 2014023835 | A1 | 2/2014 | |
| WO | WO-2014076315 | A2 * | 5/2014 | ............ F01M 11/04 |
| WO | | 2016162457 | A1 | 10/2016 | |

OTHER PUBLICATIONS

Danish Patent and Trademark Office, Search and Examination Report in PA 2017 70284, dated Oct. 18, 2017.
European Patent Office, Examination Report in EP Application No. 18717825.6, dated Jul. 28, 2021.

* cited by examiner

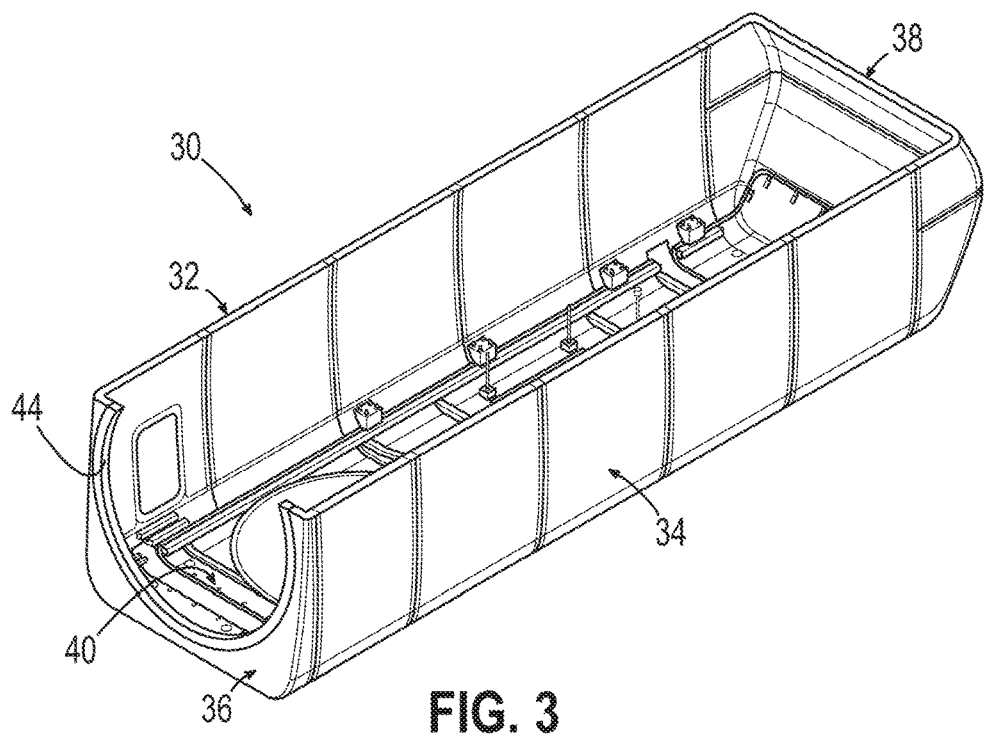
FIG. 3
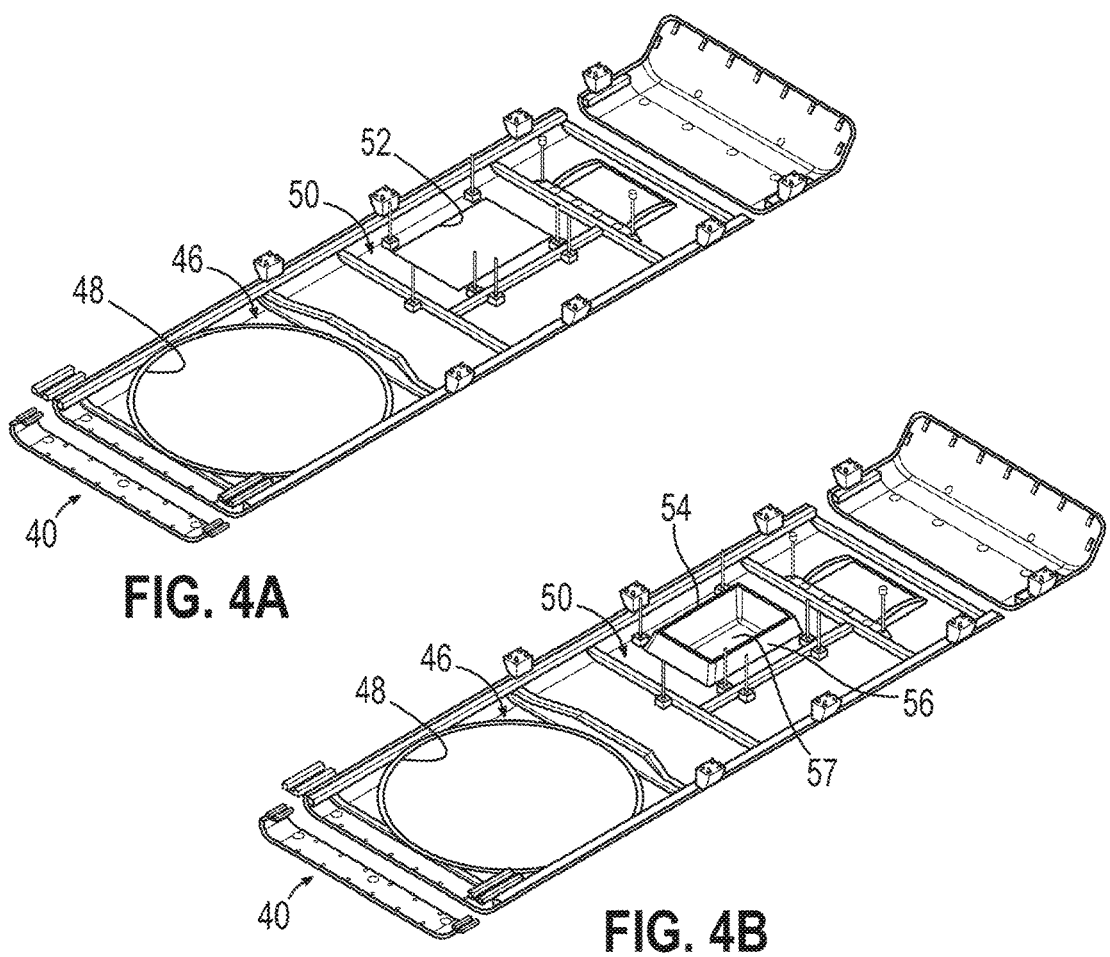
FIG. 4A
FIG. 4B

WIND TURBINE NACELLE WITH ON-BOARD FLUID SYSTEM

TECHNICAL FIELD

The invention relates to a wind turbine nacelle with an on-board fluid system, particularly, though not exclusively an on-board cooling system. The invention concerns the configuration, installation and serviceability of components of that fluid system.

BACKGROUND

As is well known, the nacelles of wind turbines house much of the machinery and control electronics associated with the main job of a wind turbine of converting wind energy to electrical energy. Wind turbines are often sited in locations with harsh weather conditions, particularly so in the case for offshore installations, and so nacelles tend to be closed environments in order to provide a relatively controlled enclosure for the components within.

Electrical converter equipment, generators and gearboxes all output considerable thermal energy during operation, and so usually nacelles incorporate a cooling system in order to manage the temperature of the nacelle environment to ensure reliable operation of the components. US2011/0095539 describes a purportedly beneficial arrangement in which a nacelle cooling system features a cooling device or heat exchanger on top of the nacelle roof, thereby placing the cooling device in the flow of air past the nacelle. However, associated components of the cooling system such as the tank, values, pumps and so on are located within the nacelle, thereby taking up space in the interior of the nacelle. Wind turbines are becoming more complex, and so nacelles are required to house more and more equipment. However, it is undesirable simply to increase the size of nacelles due to adverse aerodynamics and problems relating to transporting wind turbine components to installation sites. Also, it may be desirable to use the same nacelle design with multiple models of wind turbines, so a single nacelle design should be able to accommodate a wide range of equipment levels. Thus, an object of the invention is to improve the space efficiency of the internal components of a wind turbine nacelle.

It is against this background that the embodiments of the invention have been devised.

SUMMARY OF THE INVENTION

The present invention relates to a wind turbine nacelle comprising a plurality of power generating components and a fluid system, wherein the nacelle includes a nacelle cover comprising a lower cover or 'base', a roof and side walls, thereby defining an interior space of the nacelle, wherein the fluid system includes a fluid tank that is integrated into the nacelle cover.

By integrating the fluid tank into the nacelle cover, this frees up space inside the nacelle for other components. In addition, the position of the fluid tank can be selected in order to reduce the pipework in the cooling system. For example, integrating the fluid tank into a panel in proximity to where that fluid is needed, for example in a heat exchanger or a hydraulic device, means that less pipework is needed which can lead to a reduction weight and cost. Also, integrating the fluid tank into a panel of the nacelle cover means that the tank can be used as a bulkhead through which pipework can be routed between the interior and exterior of the nacelle. This avoids the need to form holes in other panels of the nacelle cover to allow the penetration of pipework.

The embodiments of the invention have particular utility in a fluid system which is a cooling system, such that the fluid tank is a coolant tank for housing cooling fluid. However, the fluid system could also be: a lubrication supply system for supplying a lubricating fluid such as oil to transmission components of the wind turbine, wherein the fluid tank would house lubricating oil; a hydraulic system for supplying motive power to a blade pitch control system of the wind turbine, wherein the fluid tank would house hydraulic fluid; a pneumatic system wherein the fluid tank would be a source of pressurised air or other gas. References to 'tank' and 'fluid' within this document should not therefore be interpreted as being limited to use with a cooling system unless stated explicitly otherwise.

The nacelle cover may have a multi-panel construction, such that the roof, side walls, and the base of the nacelle cover comprise one or more panels. In one arrangement the tank may be integrated into one of those panels. This provides a convenient way of integrating the tank into the nacelle cover since the tank can be installed simply by attaching the 'functional' panel to the nacelle cover where a "normal" cover would ordinarily be located.

In the context of the invention, the tank is integrated into an associated panel in the sense that it forms a single part. Thus, the tank is built-in, combined, united, part-of or otherwise associated with its respective panel so that the panel and the tank form a unified component, or a larger component than either the panel or the tank on their own. This may mean that the tank and panel are formed from a single unitary moulding, in the event that the panel is of plastics construction. Alternatively, the tank may be installed in an aperture defined in the panel and fixed to it by an appropriate manner, for example by bolts, adhesive bonding, or by welding, for example. The tank may also be removably fixed to the panel. As the tank is integrated into the panel, it is transportable with that panel as a single unit.

As an alternative to the panel and the tank being formed as a unitary whole, the panel may form only a part of the fluid tank. For example, the panel may form a base and a side wall of the tank. The tank may be completed by a closure that is a separate component. The tank may include a liner, which may provide protection for the panel against the coolant fluid and may also provide a benefit in terms of preventing leakage.

In embodiments where the coolant tank is coupled releasably to the panel, the wind turbine may include a hoist configured to attach to the coolant tank so as to be able to lower the tank away from the nacelle. Such a configuration is useful to enable the tank to be maintained at a location that is remote from the nacelle. Moreover, such an arrangement would enable the liquid in the tank to be refilled easily, or the tank could be replaced with a refilled tank or a refurbished/replacement tank. Such tank replenishment or replacement can thus be performed away from the nacelle, for example on the ground, in a more appropriate working environment.

The invention extends to a panel of a wind turbine nacelle cover, wherein the panel is configured to define at least a part of, or is coupled to, a fluid tank of a fluid system.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 3 is a perspective view of the nacelle in FIG. 1 isolated from the wind turbine and shown in shell form, with just the outer shell or cover of the nacelle visible;

FIGS. 4a and 4b are perspective views of two embodiments of floor components for the nacelle cover in FIG. 3 showing possible locations of integrated coolant tanks for the cooling system;

DETAILED DESCRIPTION

A specific embodiment of the invention will now be described in which numerous specific features will be discussed in detail in order to provide a thorough understanding of the inventive concept as defined in the claims. However, it will be apparent to the skilled person that the invention may be put in to effect without the specific details and that in some instances, well known methods, techniques and structures have not been described in detail in order not to obscure the invention unnecessarily.

Figure 1:
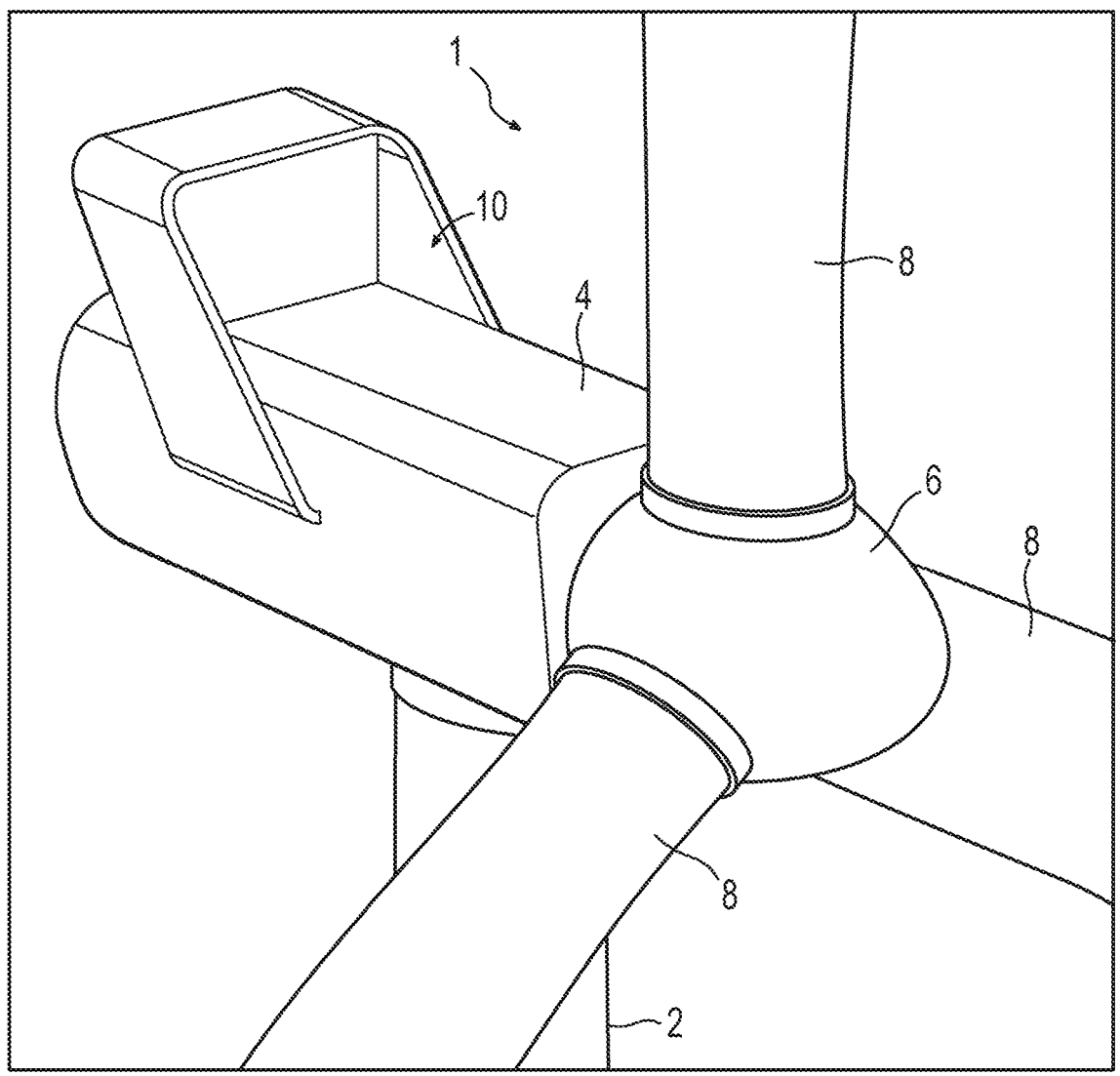
FIG. 1 is a perspective view of an upper part of a wind turbine, including a nacelle, a hub and a set of blades, in which embodiments of the present invention may be implemented.

In order to place the embodiments of the invention in a suitable context, reference will firstly be made to FIG. 1, which shows a portion of a typical horizontal-axis wind turbine 1 (HAWT) in which embodiments of the invention may be implemented.

The wind turbine 1 comprises a tower 2, a nacelle 4 rotatably coupled to the top of the tower 2, a rotating hub 6 mounted to the nacelle 4 and a plurality of wind turbine rotor blades 8 coupled to the hub 6. The nacelle 4 houses many of the generating components of the wind turbine, including the generator, gearbox, drive train and brake assembly, as well as convertor equipment for converting the mechanical energy of the wind into electrical energy for provision to the grid. The nacelle 4 also contains a main shaft housing (not shown in FIG. 1), which houses a main rotor shaft that is connected at a forward end to the hub 6 and rotor blades 8, and at a rear end to the generating components. Note that although a gearbox is included in this embodiment, the invention is also applicable to wind turbines implementing a so called direct-drive system which does not include a gearbox, and which would be well-known to the skilled person.

The nacelle 4 also contains a cooling system 10, a part of which is located on the top of the nacelle 4 and is visible in FIG. 1 which is arranged to cool the components housed within the nacelle 4, for example the generator, gearbox and other drive train components. Here a heat exchanger or 'cooler' 12 is positioned on the top of the nacelle so it is in an advantageous location for air to flow through the heat exchanger to dissipate thermal energy from it. Heat exchangers can be located in other positions, inboard the nacelle with suitable air channels feeding cooling air to and from the heat exchanger.

Typically, the cooling systems utilised in wind turbine nacelles are liquid cooling systems, and therefore the subsequent methods focus on the features of such systems. However, it will be understood that alternative systems such as evaporative cooling systems may be implemented instead, and the methods described herein may equally be applied to such alternative cooling systems. The liquid cooling system that will be described hereafter is one in which the coolant remains a liquid throughout the system, and merely varies in temperature. However, it will be appreciated that other variants of liquid cooling system could also be suitable for use in a wind turbine—for example, a two-phase liquid cooling system in which the coolant transitions between the liquid and vapour phases.

Figure 2:
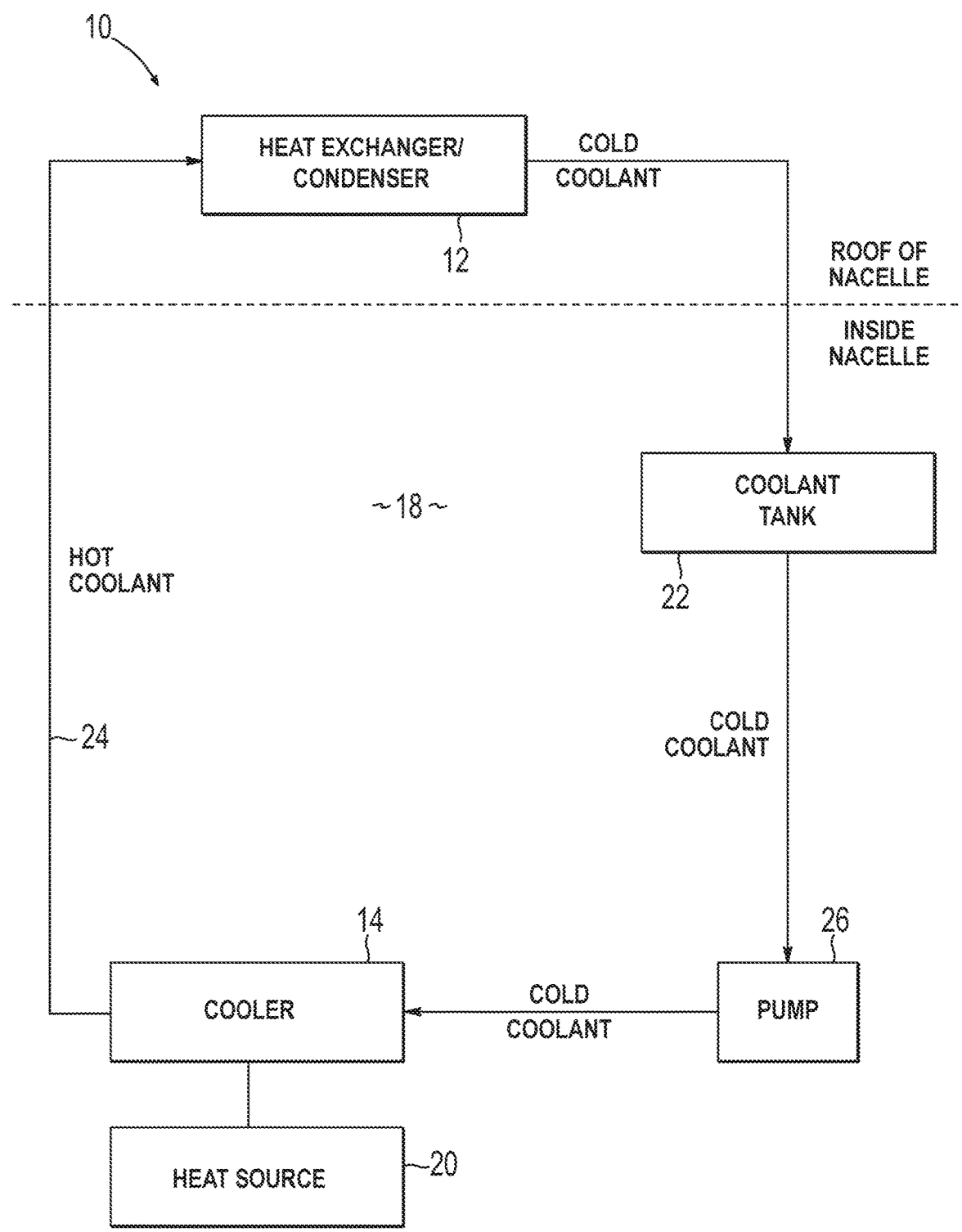
FIG. 2 is a schematic diagram of an example of a cooling system implemented in the nacelle of the wind turbine of FIG. 1.

FIG. 2 shows the cooling system 10 in more detail. It should be appreciated that the cooling system is shown in FIG. 2 as schematic in form, and is intended to be an example of the type of cooling system with which wind turbine nacelles may be equipped. As the operation of such liquid cooling systems is generally well known to the person skilled in the art, only a brief description of how such a system works will be provided here to place the embodiments of the invention in context.

In general, the purpose of the liquid cooling system is to transfer thermal energy from an internal environment of the wind turbine, out to the external environment of the wind turbine. The cooling system 10 comprises first and second heat exchangers 12, 14, connected by a fluid circuit such that coolant is able to flow between the two heat exchangers. One of these two heat exchangers, the first heat exchanger 12, is that which is located on the roof of the nacelle 4 so as to be exposed to the external environment so it is able to transfer thermal energy away from the interior space 18 of the nacelle. The second heat exchanger 14 is located within the nacelle and is arranged to absorb thermal energy from the interior space 18. Further heat exchangers may be included in the interior space of the nacelle, for example coupled to specific heat-generating components within the nacelle— these may be oil coolers, for example, or liquid cooled heat sinks for electronic components. In some cases, the cooling system also comprises one or more monitoring components arranged to monitor the operational parameters of the cooling system, and thereby ensure that the cooling system is functioning as intended.

The second heat exchanger or 'cooler' 14 is in thermal contact with a heat source 20 that is to be cooled (for example, the generator or various other electronic components located within the nacelle). In some cases, the cooler 14 may take the form of a cold plate or cooling coils that are placed in direct or close proximity to the heat source 20, such that the coolant entering the cooler 14 absorbs thermal energy from the heat source 20. The first heat exchanger 12 or 'condenser' receives heated coolant from the cooler 14 and enables the thermal energy from the coolant to be dissipated. The condenser is generally referred to as such in those embodiments where the coolant is heated to a sufficient temperature to enable it to be vaporized, as the dissipation of thermal energy from the coolant by the condenser results in the re-condensation of the hot vaporized coolant into cooler liquid form. However, for simplicity and to avoid confusion between the two heat exchangers in the cooling system, the term 'condenser' will be used hereafter into refer generically to the heat exchanger which is arranged to dissipate thermal energy to the external environment. The liquid cooling system 10 also comprises a coolant storage component or 'tank' 22 arranged to receive and store cold liquid coolant from the heat exchanger 12. A pipe network 24 provides a fluid circuit and fluid connections between the various components, and a circulation pump 26 is also provided to drive circulation of coolant around the liquid cooling system 10 via the pipe network 24. It should be appreciated at this point that more than one first and second heat exchanger may be provided.

In use, as previously mentioned, the cooler 14 is located within the nacelle 4 and in close proximity to the heat source 20 that is to be cooled. For example, as previously discussed, the cooler 14 may be placed directly under or next to the generator component. Alternatively, the cooler 14 may take the form of an air conditioning unit that blows cool air through the nacelle and across the hot components. The cooler 14 may also take the form of cooling fins projecting from various components to radiate thermal energy away from those components. In order to function efficiently, the condenser 12 should be exposed to the outside air, and may be located on the roof of the nacelle 4 for example. Cold coolant is pumped from the coolant tank 22 (where it is stored) to the cooler 14; the thermal energy from the heat source 20 is absorbed by the cold coolant which in turn heats up. The hot coolant flows away from the cooler 14, carrying the thermal energy away, and enters the condenser 12 where the thermal energy is dissipated. The now cold coolant is then returned to the coolant tank 22 to begin the cycle again.

The above discussion provides context for the invention as it gives an understanding of the typical components of a cooling system of a wind turbine. It will be appreciated that the nacelle is required to house the generating components of the wind turbine, various control electronics and power transmission equipment and, in addition, many components of the cooling system. All of these components take up significant space within the nacelle. Generally, it is desirable to minimise the physical size of the nacelle, so there is a general design objective to package the components in a space-efficient way. US2011/0095539 illustrates a known configuration of a wind turbine nacelle having a cooling system featuring a heat exchanger or located on the roof of the nacelle. Notably, the rest of the cooling system components are located within the nacelle. Referring specifically to the coolant tank, it should be appreciated that this component has a substantial volume since it typically will be required to house between 100 and 200 litres of coolant fluid. Such a component therefore takes up valuable space inside the nacelle.

The inventors have developed a beneficial approach to the packaging of the cooling system within the confines of a nacelle which provides a significant space-saving advantage. The interior space of the nacelle is defined by a nacelle cover, which is typically an arrangement of plastics or composite panels that define the distinctive elongated cuboidal shape of the nacelle. Typically, the nacelle cover is formed from several adjoining panels to define a base or 'lower cover'of the nacelle, side walls and a nacelle roof. Typically, each of the floor, side walls and roof will also be formed from adjoining panels, although it is possible for these nacelle side faces to comprise a single panel if the size of the nacelle so permits. Set against this context, in the embodiments of the invention as will be described below, the cooling system includes a coolant tank that is integrated into the nacelle cover. More particularly, the coolant tank may form an integral part of a cover panel of the nacelle, either in the nacelle base, side walls or roof. As such, the coolant tank integrated into a cover panel forms a functional panel such that the panel in question has a function in addition to providing an outer shell of the nacelle.

The functional panel may be incorporated into one or more of the roof, side walls or the base of the nacelle cover. Depending on where the functional panel is incorporated, the functional panel may be configured in different ways or provided with different functionality. For example, if the functional panel is integrated into the base of the nacelle cover, the coolant tank of that functional panel may be configured to be detachable from its panel. This would allow the coolant tank to be lowered from the nacelle by suitable hoisting equipment. Note that more than one functional panel may be provided, each of which has an associated integrated tank. This may be useful for increasing the overall volume of coolant in the cooling system without increasing the size of any one tank.

FIG. 3 illustrates a nacelle cover 30 in isolation from the wind turbine tower, and without any power generating components so the structure of the nacelle cover can be readily appreciated. The nacelle cover is shaped generally like an elongated cuboid having two opposed side walls 32, 34, a front wall 36 and a rear wall 38, a floor 40 and a roof (not shown in FIG. 3, but shown later). As the nacelle cover 30 is elongate in shape, the side walls are longer than the front and rear walls and, in this embodiment, about twice as long. Various shapes of nacelle covers are known in the art.

In FIG. 3, the nacelle cover 30 is oriented such that the front wall 36 is on the left hand side of the drawing, with the rear wall 38 facing to the right. References to the front, rear and so on should therefore be considered with reference to the drawings only. Also, as per convention, the 'front' of the nacelle is taken to be that closest to the hub.

In this context, the front wall 36 includes a substantially circular cut out 44 which is designed to accommodate the main rotor shaft (not shown) of the wind turbine, as the skilled person would appreciate.

As is apparent from FIG. 3, the side walls 32,34, rear wall 38, and floor 40 of the nacelle cover 30 are each formed from several adjoining panels, which are fixed together through suitable, conventional, flanged fixings. Forming the nacelle cover in this way is more convenient from a manufacturing perspective, although in principle each of the floor, roof and side walls could be formed by a single panel.

The base 40 of the nacelle cover 30 is shown separately to the rest of the nacelle cover 30 in FIGS. 4a and 4b. The multi-panel construction of the nacelle floor 40 is apparent in these figures as the joints between adjoining panels can be seen clearly. To the left of FIGS. 4a and 4b, the nacelle cover 30 includes a 'tower' panel 46 that is relatively large compared to the others and which includes an aperture 48, which in this embodiment is circular. This circular aperture 48 accommodates the wind turbine tower and associated yaw gearing at the upper end of the tower when the nacelle is installed.

Roughly in the centre of the nacelle floor 40, one panel to the right of the tower panel 46, is a functional panel 50 in which the coolant tank is integrated.

Referring firstly to FIG. 4b, the functional panel 50 is generally oblong in shape so as to fit against its neighbouring panels.

The functional panel 50, in this embodiment, is a generally flat sheet, for example of a suitable plastics material such as glass fibre. In this context, the nacelle panels may be a single sheet of material, or laminations of more than one sheet, and even of a sandwich panel construction including a core section (e.g. foam) sandwiched between sheets. A metal construction would also be possible, for example of aluminium sheet material. The functional panel 50 has an integrated tank that is formed from one or more components. Here the functional panel 50 comprises a first tank component 54, shaped like a basin, which is open-topped in this embodiment and so defines part of a chamber. The first tank component 54 is defined by an upstanding wall 56 that defines the perimeter of the tank. The side wall 56 extends from a base 57 of the tank. Here, the side wall 56 is formed integrally with the panel 50, but it should be appreciated that the side wall 56 may be a separate component. By 'separate', it is meant that the side wall may not be unitary feature with the base, as would be achieved through moulding the panel, base and sidewalls as a unified part. Instead, the side wall could be fixed to the base 57 by any appropriate technique, for example by plastic welding, adhesive bonding or by suitable mechanical fasteners. Although not shown in FIG. 4b, a suitable closure in the form of a lid may be provided in order to form the completed tank. It is envisaged that the lid may be a separate component, in a similar sense to the side wall, as discussed above, which may be joined to the upstanding wall by suitable means. For example, the lid may be plastic-welded to the wall or it may simply be removably fastened into place using suitable clip-type fasteners, bolts or any other suitable fastener.

Openings may be provided in the surfaces of the tank to enable fluid to be admitted to and removed from the tank during use. Other openings may be provided to allow components to be placed into the tank, such as pumps.

The side wall 56 in this embodiment delineates a generally square shaped tank, but it should be appreciated that this need not be the case and, instead, the tank may be other shapes, in plan, such as oval or circular. When manufactured from a suitable plastics material, the functional panel 50 with its integrated tank 22 may be formed by a single moulding process.

To provide an appreciation of the scale of the functional panel 50, and of the tank, it is envisaged that the volumetric capacity of the tank may be around 100 litres to 200 litres, depending on the application, which may result in a square-shaped tank with sides of approximately 1 m in length, and a height of approximately 20 cm. The panel and the integrated tank may be formed such that the panel provides a mounting flange for fixing the tank with respect to neighbouring panels. It is envisaged that the panel will be sized to fix/match with neighbouring panels to retain the contiguous over surface of the nacelle cover.

The tank 22 may be configured so that other components of the cooling system may be contained within it. For example, the coolant pump may be housed within the tank, and, as such, may be mounted on suitable mounting points (not shown) provided on the base of the tank.

FIG. 4a shows another embodiment in which the functional panel 50 includes an aperture 52 in which a completed tank may be coupled/installed, so as to become an integral part of the functional panel 50. In doing so, the tank may be a permanent fixture, such as by welding, or may be fixed to the panel 50 by suitable releasable fasteners.

Figure 5:
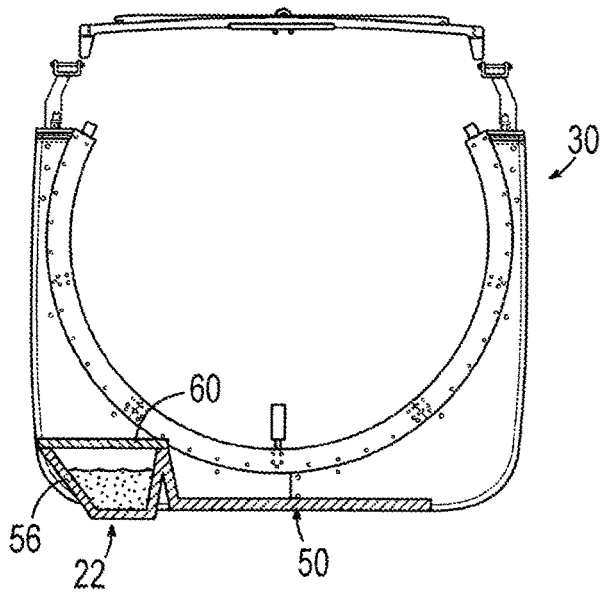
FIGS. 5, 6 and 7 are schematic front views of embodiments of a wind turbine nacelle which show alternative configurations for integrated coolant tanks for the cooling system.
Figure 6:
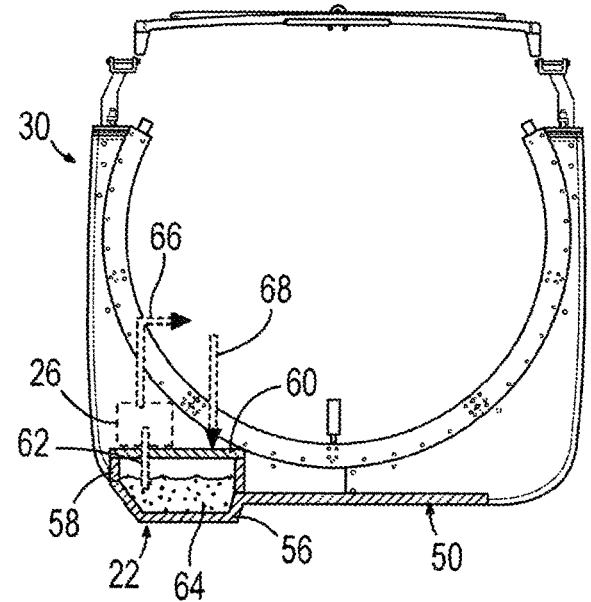
Figure 7:
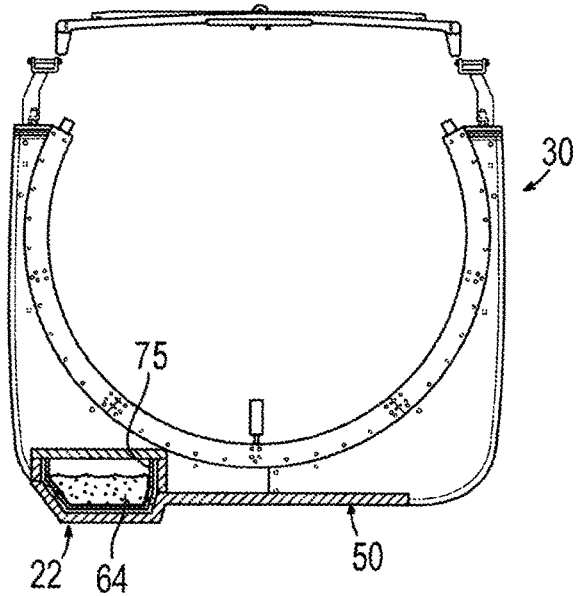

Turning to schematic FIGS. 5, 6 and 7, these figures illustrate variants of a functional panel 50 installed in a nacelle cover 30 and equipped with an integrated coolant tank 22. Parts already referenced in previous figures will be referred to using the same reference numerals.

Firstly, in FIG. 5 the coolant tank 22 is defined as an integral part of the functional panel 50 and is defined largely by relative deep side wall 56. However, a separate closure or lid 60 closes off the tank 22. Notably, the tank is integrated with the panel so that the general planar shape of the tank is generally parallel with the plane defined by the surrounding panel. More particularly, in this and other embodiments, the depth of the tank spans the panel so that part of the tank lies inboard of the nacelle cover and part of the tank lies outboard of the nacelle cover. However, in other arrangements this may not be the case and the tank may be entirely inboard or outboard of the cover panel. For example, the cover panel may define a base of the tank in such a way that the tank does not protrude through the cover panel at all. Furthermore, the cover panel may define a base to which the tank is secured, for example by appropriate adhesive bonding. The tank may alternatively be secured to the outer facing side of the cover panel.

In FIG. 6, it is apparent that the coolant tank 22 is defined, in part, by a shallower side wall 56. However, the height of the wall 56 is augmented by a wall extension 58 or 'collar'. The wall extension 58 may be secured to the side wall 56 by any suitable means. Optionally, a seal (not shown) may be provided between the side wall 56 and the wall extension to ensure water tightness. Similarly to FIG. 5, a closure or lid 60 is provided to close off the tank 22. Note that in these embodiments, the lid 60 may be used as a support for other components of the cooling system. One example of this is that the pump 26 could be supported on the lid 60. The pump 26 may be configured to have an inlet pipe 62 to draw coolant fluid 64 from the tank, and an outlet pipe 66 to provide coolant fluid to the coolant network 24. A tank inlet 68 may also be provided through the lid for coolant fluid to enter the tank 22, although such an inlet may also be provided through the wall of the tank 22. As mentioned, the pump 26 may also be housed in the interior of the tank.

The embodiment of FIG. 7 is substantially the same as FIG. 6 so only the differences will be described. Here, it will be noted that the tank 22 is provided with a liner 75. The liner is sheet-like in form and may be a suitable plastics material such as nitrile rubber, as one example. Usefully the liner serves to ensure water tightness of the tank 22. This can be a benefit if the outer surface of the functional panel 50 is compromised in some way. Moreover, it can serve to protect the material of the functional panel coming into contact with the coolant 64, in the event that the coolant may have an adverse reaction to the panel.

Figure 8A:
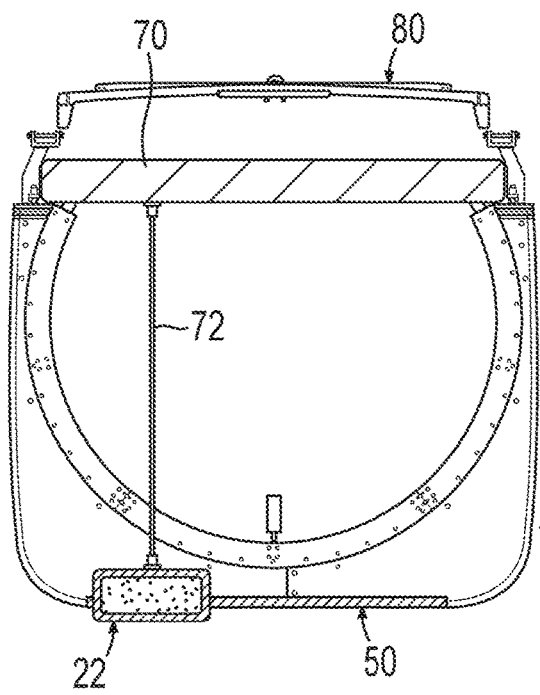
FIGS. 8a and 8b are schematic front views of a wind turbine nacelle having a further configuration of an integrated coolant tank, in accordance with a further embodiment of the invention.
Figure 8B:
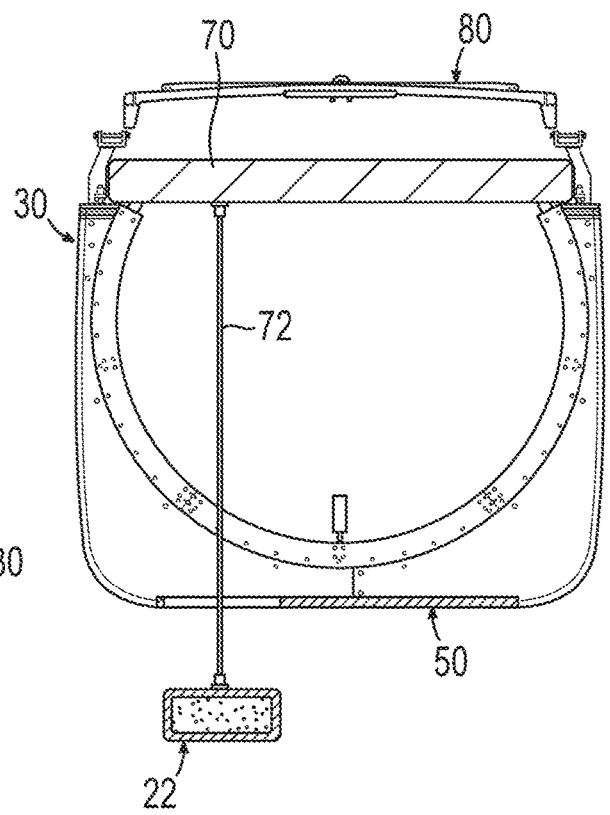

FIGS. 8a and 8b show a further embodiment of the invention, again which includes a tank 22 integrated into a functional panel 50 of a nacelle cover 30. In this arrangement, however, the tank 22 is releasably coupled to the functional panel 50. Although not shown in these figures, the releasable coupling may be achieved by bolts, or twist lock connectors, which would be known to the skilled person. Since the tank 22 may be removed or decoupled from the functional panel 50, this means that the tank 22 may be removed for maintenance purposes. One way in which this could be achieved is illustrated in FIGS. 8a and 8b. Here, a hoist 70 is shown housed within the nacelle and provides a hoist line 72, e.g. in the form of a cable or wire, attached to the tank 22. The hoisting line 72 may be attached to the tank 22 permanently, or it may be attachable by operating personnel only at times where the tank 22 is needed to be lowered down from the nacelle, as is shown in FIG. 8b.

Beneficially, this arrangement means that the tank 22 can be lowered to the ground, or a substitute platform, for inspection and maintenance. For example, the cooling system could be drained into the tank 22 and the tank could be lowered from the nacelle, the cooling fluid could be replaced with fresh fluid, and then the tank 22 could be hoisted back up to its position in the functional panel 50. This would avoid the need for heavy coolant fluid to be transported up to the nacelle for replacing the fluid in the tank. In embodiments where coolant pumps and perhaps other components such as filters, are housed within the tank 22, this procedure would enable such components to be inspected, repaired or replaced without needing to transport those components to the nacelle.

Figure 9:
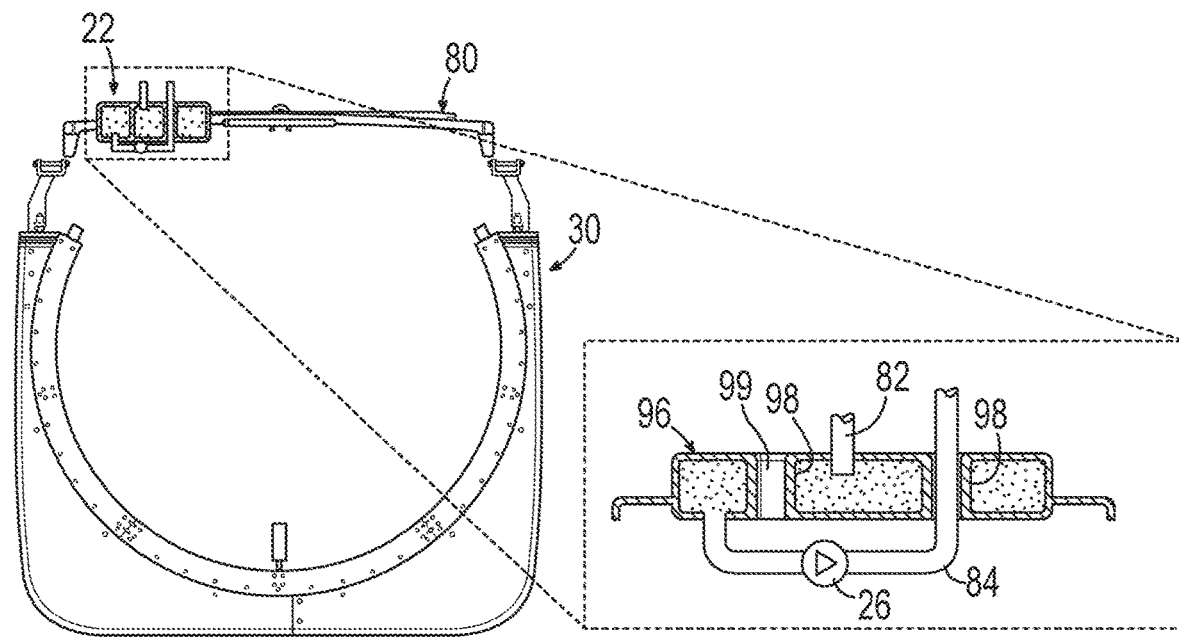
FIG. 9 is a schematic front view of a wind turbine nacelle having a coolant tank integrated into the roof of the nacelle cover, in accordance with a further embodiment of the invention, and which shows a cross section view through the coolant tank in more detail in an inset panel.
Figure 10:
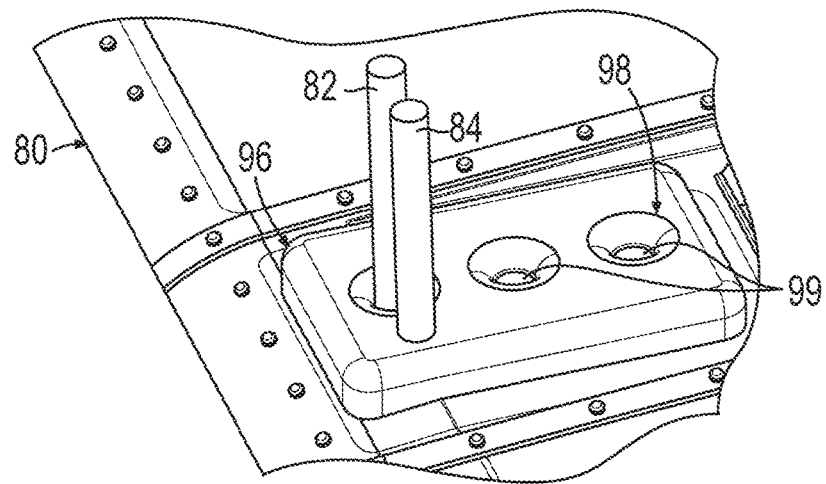
FIG. 10 is a perspective view of a portion of the nacelle roof in FIG. 9 isolated from the rest of the nacelle cover, and which shows an alternative view of the coolant tank integrated into the roof.

FIGS. 9 and 10 illustrate various views of a further embodiment of the invention, and the same reference numerals will be used to refer to the same or similar parts as in the previous embodiments. In the same way as the previous embodiments, here the nacelle cover 30 includes an integrated coolant tank 22. However, coolant tank 22 is shown as being integrated into a roof 80 of the nacelle cover. The roof 80 also has a panel-like construction in the same way as the nacelle side walls 32,34 and floor 40, and so, accordingly, the coolant tank 22 is seen here as being integrated into a functional panel 50.

The location of the coolant tank 22 integrated into the roof 80 of the nacelle cover 30 has certain advantages, and this is particularly the case in wind turbine systems where the main heat exchanger is located on the roof of the nacelle. This is demonstrated by the inset panel of FIG. 9 which shows a sectional view through the tank 22. Here, it can be seen that the tank has an integrated inlet pipe 82 and outlet pipe 84. A pump 26 may be included in the outlet pipe. Due to the location of the tank 22 on the roof 80 of the nacelle, this puts it in close proximity with roof-mounted heat exchangers, and so reduces the distance required to route pipework to and from the heat exchanger. This reduces complexity of the cooling system and also reduces weight and cost.

A particularly beneficial feature is provided by virtue of the mechanical structure of the coolant tank 22, as can be seen in the inset panel in FIG. 9 and also in FIG. 10. The tank 22 in this embodiment is produced in a moulding process which incorporates an integrated strengthening structure 96. In this embodiment the strengthening structure 96 is in the form of a series of column formations 98 that create a through hole or aperture 99 between the upper and lower faces of the tank. The column formations 98 provide the generally planar form of the tank 22 with additional rigidity between its upper and lower faces. In this embodiment, the existence of the through holes created by the column formations 98 is exploited by using the holes as 'grommets' or 'bulkheads' between the exterior of the nacelle and the interior of the nacelle so that pipework can pass through those holes. Additional sealing can be provided by use of an epoxy or silicone sealant around the pipe and associated hole or by the use of a suitably formed rubber sealing member, in the form of an o-ring or cone, for example. Therefore, the tank may function as a bulkhead through which pipework may pass between the interior and the exterior of the nacelle. This avoids the need to modify other panels with suitable apertures to allow pipework to pass through the nacelle cover. This can reduce the complexity of the nacelle cover and also reduce the risk of those panels suffering from weak points.

Various modifications to the illustrated embodiments have already been described above. However, the skilled person would appreciate that other modifications could be made to the specific embodiments without departing from the inventive concept as defined by the claims.

The embodiments described above are set in the specific context of a wind turbine cooling system in which the tank is for cooling fluid. However, it should be appreciated that the same principle could be applied to any fluid system contained within the wind turbine. For example, rotating machinery such as gearboxes require lubrication and so a lubrication system would require a tank for a lubrication fluid such as oil, a fluid circuit to delivering that lubrication fluid to where it is needed, and also a pump for generating pressure within the fluid circuit. The same applies for hydraulic systems of the wind turbine such as a blade pitching system which, as the skilled person will know, requires a source of pressurised hydraulic stored in a hydraulic accumulator or tank. The same principle would also apply to pneumatic systems where, instead of liquids such as oil, hydraulic fluid and coolant, a tank could be arranged to store pressurised air as part of a pneumatic circuit. In view of the above, references to 'tank', 'fluid' and so on should be interpreted to mean that the components could be used in systems other than a cooling system wherein a tank, accumulator or other storage device could be used to store fluid, be it a liquid or a gas, for the use in an associated system.

The invention claimed is:

1. A wind turbine nacelle, comprising:
    a nacelle cover comprising a base, a roof and side walls, thereby defining an interior space of the nacelle, wherein each of the base, roof, and side walls is formed from a plurality of adjoining panels;
    a plurality of power generating components in the interior space of the nacelle; and
    a fluid system comprising a fluid tank, wherein the fluid tank is integrated into a panel of the plurality of adjoining panels that forms one of the base, roof, or side walls of the nacelle cover,
    wherein the panel defines an aperture and the fluid tank is received in and coupled to the aperture defined in the panel.

2. The wind turbine nacelle of claim 1, wherein the nacelle cover includes a roof panel into which the fluid tank is integrated.

3. The wind turbine nacelle of claim 1, wherein the nacelle cover includes a side wall panel into which the fluid tank is integrated.

4. The wind turbine nacelle of claim 1, wherein the nacelle cover includes a base panel into which the fluid tank is integrated.

5. The wind turbine nacelle of claim 4, wherein the fluid tank includes a separate closure.

6. The wind turbine nacelle of claim 1, wherein the fluid tank is releasably coupled to the panel.

7. The wind turbine nacelle of claim 1, further comprising a hoist including a lifting line coupled to the fluid tank, wherein the hoist is configured to lower the fluid tank away from the base of the nacelle.

8. The wind turbine nacelle of claim 1, wherein the fluid tank includes a fluid pump.

9. The wind turbine nacelle of claim 1, wherein the fluid tank includes one or more apertures to allow pipe work to pass through the panel between the interior space and an exterior of the nacelle.

10. The wind turbine nacelle of claim 1, wherein the fluid tank includes a liner.

11. The wind turbine nacelle of claim 1, wherein the fluid system is a cooling system, and wherein the fluid tank is a coolant tank for housing cooling fluid.

12. A panel of a wind turbine nacelle cover having a base, roof, and side walls, wherein each of the base, roof, and side walls is formed from a plurality of adjoining panels, the panel comprising:

a panel body that forms one of the plurality of adjoining panels of one of the base, roof, or side walls; and a fluid tank of a fluid system, wherein the panel body is configured to define at least a part of or is coupled to the fluid tank, wherein the fluid tank is received in and coupled to an aperture defined in the panel body.

13. The panel of claim 12, wherein the panel body is generally planar in form and defines at least a base of the fluid tank.

14. The panel of claim 12, wherein the fluid tank is releasably coupled to the panel body.

15. The panel of claim 12, wherein the fluid tank includes a liner.

16. The panel of claim 12, wherein the fluid tank includes a strengthening structure that defines apertures through the tank thereby to allow pipes to pass through said apertures.

* * * * *